(12) United States Patent
Laskharian et al.

(10) Patent No.: US 7,313,373 B1
(45) Date of Patent: Dec. 25, 2007

(54) CREST FACTOR REDUCTION FOR USE IN A MULTIBAND TRANSMITTER

(75) Inventors: Navid Laskharian, Pleasanton, CA (US); Hai-Jo Tarn, Santa Clara, CA (US); Christopher H. Dick, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 456 days.

(21) Appl. No.: 11/111,600

(22) Filed: Apr. 21, 2005

(51) Int. Cl.
*H04Q 7/00* (2006.01)
*H04B 1/06* (2006.01)

(52) U.S. Cl. .............................. 455/127.1; 455/552.1; 455/553.1; 455/208

(58) Field of Classification Search ............. 455/552.1, 455/553.1, 84, 260, 208, 73, 180.1, 255, 455/141, 127.1
See application file for complete search history.

(56) References Cited

U.S. PATENT DOCUMENTS

| 7,058,380 B2 * | 6/2006 | Sato ........................... 455/260 |
| 2005/0164733 A1 * | 7/2005 | Sato ........................ 455/553.1 |

* cited by examiner

*Primary Examiner*—Tony T. Nguyen
(74) *Attorney, Agent, or Firm*—W. Eric Webostad (57) ABSTRACT

Crest factor reduction in a multiband transmitter is described. Component signals ($x_i[n]$) are respectively obtained from constituent signals. The component signals ($x_i[n]$) are respectively associated with sub-bands. A superposed signal associated with the component signals ($x_i[n]$) is clipped to obtain a clipping noise error signal. The clipping noise error signal is applied to the component signals ($x_i[n]$) using a least squares estimation to project clipping noise error onto the sub-bands.

20 Claims, 5 Drawing Sheets

CREST FACTOR REDUCTION FOR USE IN A MULTIBAND TRANSMITTER

FIELD OF THE INVENTION

One or more aspects of the invention relate generally to communications and, more particularly, to crest factor reduction for use in a multiband transmitter.

BACKGROUND OF THE INVENTION

In over-the-air communications systems ("wireless systems"), cost of bandwidth may be a significant factor in overall system cost. Accordingly, accommodating many users in a system may be a means for enhancing bandwidth usage to reduce cost to individual users.

To accommodate many users in a system, multiband communication systems conventionally include a transmitter that provides a transmission signal which is a combination of baseband signals. Conventionally, these baseband signals have independent statistical characteristics occupying non-overlapping frequency bands ("sub-bands"). Because these sub-band signals are combined in a transmission signal, there is a potential for super-positioning of signals where peaks of a combined signal are sufficiently additive, or subtractive in the negative direction, to exceed a peak threshold.

Accordingly, signal peak-to-average power ratio ("PAPR") is a transmitter characteristic. Because PAPR of a superposed multiband signal may be substantially high, to accommodate such peaks would lead to high power consumption in a radio frequency amplifier or other power amplifier. Moreover, to provide a digital-to-analog converter ("DAC") for example that would accommodate such possible peaks would be more costly than a DAC that would not accommodate such peak dispersion. Moreover, nonlinear characteristics of a power amplifier conventionally increase exponentially with the increase of PAPR of a signal.

Thus, it should be apparent that bandwidth efficiency and transmission power efficiency may be conflicting criteria in design of a digital transmission system, or more particularly, design of a digital front-end architecture for a multiband transmitter.

One way of mitigating PAPR is to clip peaks of a signal prior to digital-to-analog conversion and power amplification. However, when one clips or otherwise removes a portion of the signal, there may be a consequence of reducing transmitter performance. One measure of this reduction is quantified in terms of error vector magnitude ("EVM"). EVM is the ratio of transmitter induced noise power to the undistorted transmit signal of such transmitter.

Moreover, clipping a signal in a multiband application may lead to generating noise not just in one sub-band but in one or more other sub-bands. A quantification of this introduced noise from one band to another is known as adjacent channel leakage ratio ("ACLR").

It should be understood that a transmitter design approach that facilitates finding an intersection of PAPR, EVM, and ACLR solution spaces would be desirable and useful for transmitter design. Heretofore, others have proposed crest factor reduction ("CFR") algorithms for a particular modulation format, such as multi-carrier wide-band code division multiple access ("WCDMA") and orthogonal frequency division multiplexing ("OFDM"), among other known modulation formats. Moreover, others have proposed CFR for single-band transmitters.

Accordingly, it would be desirable and useful to provide a transmitter design which is less dependent on modulation format than previously thought. More particularly, it would be desirable and useful to provide a transmitter with CFR configured to accommodate any of a variety of multiband transmitters.

SUMMARY OF THE INVENTION

One or more aspects of the invention relate generally to communications and, more particularly, to crest factor reduction for use in a multiband transmitter.

An aspect of the invention is a method for crest factor reduction in a multiband transmitter, including: obtaining baseband signals; combining the baseband signals to provide a superposed signal; clipping the superposed signal to limit magnitude of the superposed signal; obtaining a clipping error caused by the clipping; least squares projecting of the clipping error into sub-band components of the baseband signals to provide projected error components; filtering the projected error components; upconverting the projected error components to frequency bands associated with the baseband signals; and adding the projected error components filtered and upconverted to the superposed signal.

Another aspect of the invention is a method for crest factor reduction in a multiband transmitter, including: obtaining a clipped version of a superposed signal; obtaining an error component associated with the clipped version of the superposed signal; projecting the error component into sub-bands using a least squares estimation to provide sub-band errors; spectrally shaping the sub-band errors to comply with an adjacent channel leakage ratio of the multiband transmitter; frequency modulating resultant noise from the shaping of the sub-band errors to corresponding sub-band frequencies to provide error components; and combining the error components spectrally shaped and frequency modulated with the superposed signal.

Yet another aspect of the invention is an integrated circuit for crest factor reduction in a multiband transmitter, where the multiband transmitter has adjacent channel leakage ratio ("ALCR"), peak-to-average power ratio ("PAPR"), and error vector magnitude ("EVM") parameters. The integrated circuit includes: a clipping circuit coupled to receive a superposed signal and configured to clip the superposed signal; a first combiner coupled to receive the superposed signal clipped and configured to generate a clipping error signal; a least squares fit circuit coupled to receive component signals and the clipping error signal, where the least squares fit circuit is configured to project clipping noise error associated with the clipping error signal onto sub-bands associated with the component signals such that sub-band noise is projected onto the component signals; a bandpass filtering circuit coupled to receive the component signals with the sub-band noise thereon and configured to shape the sub-band noise projected onto each of the component signals to provide noise-shaped subspace error signals; a second combiner coupled to receive the noise-shaped subspace error signals and configured to combine the noise-shaped subspace error signals to provide a noise-shaped clipping error signal within the ACLR, PAPR and EVM parameters; and a third combiner coupled to receive the superposed signal and the noise-shaped clipping error signal at least approximately phase aligned and configured to combine the superposed signal and the noise-shaped clipping error signal to provide a crest factor adjusted version of the superposed signal.

Yet another aspect of the invention is an integrated circuit for crest factor reduction in a multiband transmitter, including: modulators for receiving constituent signals associated with a signal space and frequency shifted signals, where the modulators are configured to provide component signals occupying respective signal subspaces of the signal space which are respectively associated with the constituent signals; a first combiner coupled to receive the component signals and configured to combine the component signals to provide a superposed signal; a clipping circuit coupled to receive the superposed signal and configured to provide a clipped superposed signal; a second combiner coupled to receive and to combine the superposed signal with the clipped superposed signal to generate a clipping error signal; a least squares fit circuit coupled to receive the component signals and the clipping error signal, where the least squares fit circuit is configured to project clipping noise error associated with the clipping error signal onto the signal subspaces of the component signals; a bandpass filtering circuit coupled to receive the component signals with the clipping noise error projected thereon and configured to provide noise-shaped subspace error signals respectively responsive to bandpass filtered versions of the component signals to remove at least a portion of the clipping noise error respectively projected thereon; a third combiner coupled to receive the noise-shaped subspace error signals and configured to combine the noise-shaped subspace error signals to provide a noise-shaped space error signal; and a fourth combiner coupled to receive the superposed signal and the noise-shaped space error signal at least approximately phase aligned and configured to combine the superposed signal and the noise-shaped error signal to provide a crest factor adjusted version of the superposed signal.

BRIEF DESCRIPTION OF THE DRAWINGS

Accompanying drawing(s) show exemplary embodiment(s) in accordance with one or more aspects of the invention; however, the accompanying drawing(s) should not be taken to limit the invention to the embodiment(s) shown, but are for explanation and understanding only.

DETAILED DESCRIPTION OF THE DRAWINGS

In the following description, numerous specific details are set forth to provide a more thorough description of the specific embodiments of the invention. It should be apparent, however, to one skilled in the art, that the invention may be practiced without all the specific details given below. In other instances, well known features have not been described in detail so as not to obscure the invention. For ease of illustration, the same number labels are used in different diagrams to refer to the same items, however, in alternative embodiments the items may be different. Moreover, for purposes of clarity, a single signal or multiple signals may be referred to or illustratively shown as a signal to avoid encumbering the description with multiple signal lines. Moreover, along those same lines, a multiplexer or a register, among other circuit elements, may be referred to or illustratively shown as a single multiplexer or a single register though such reference or illustration may be representing multiples thereof. Furthermore, though particular signal bit widths, data rates, and frequencies are described herein for purposes of clarity by way of example, it should be understood that the scope of the description is not limited to these particular numerical examples as other values may be used.

Figure 1:
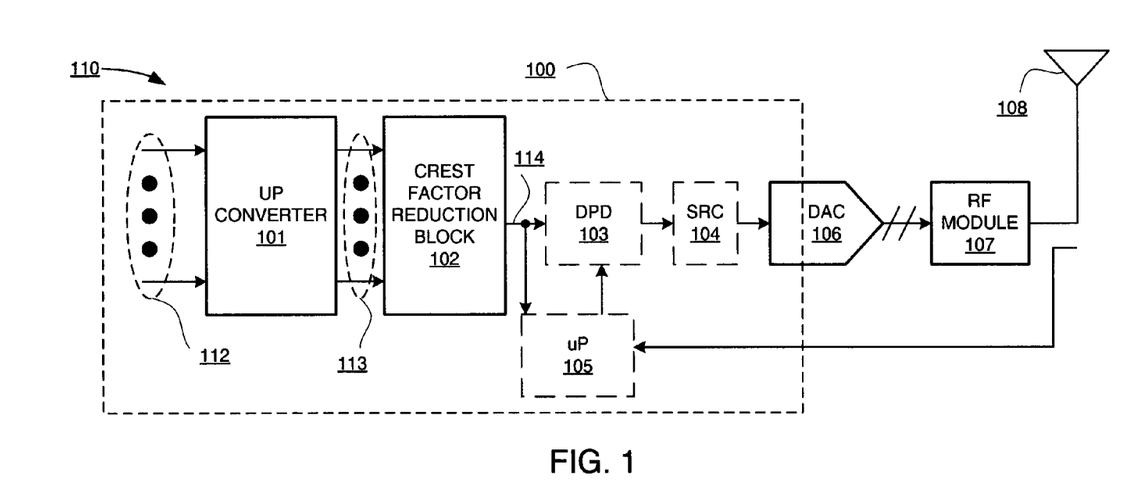
FIG. 1 is a high-level block diagram depicting an exemplary embodiment of a digital front-end of a multiband transmitter.

FIG. 1 is a high-level block diagram depicting an exemplary embodiment of a digital front-end 100 of a multiband transmitter 110. Notably, transmitter 110 may be for any of a variety of known modulation formats including WCDMA and OFDM. "Including" as used herein shall mean including without limitation.

A set of independent complex signals 112 are provided to up converter 101 of digital front-end 100. Up converter 101 up samples input signals 112 and in response provides a set of signals 113, where signals 113 are independent complex signals, such as independent complex Gaussian signals. Signals 113 may be baseband signals for separate channels. Crest factor reduction ("CFR") block 102 provides output 114. Output signal 114 is a PAPR-controlled signal within predefined peak thresholds.

CFR block output 114 may be provided to digital to analog converter ("DAC") 106 for conversion of digital output from CFR block 102 into analog signaling. Such analog signaling output from DAC 106 may be provided to a radio frequency ("RF") module 107 for modulation and power amplification. Output of power RF module 107 may be provided to antenna 108 for transmission.

It should be appreciated that CFR block output 114 is PAPR-controlled such that its input to DAC 106 is within sensitivity of DAC 106. It should also be appreciated that input 113 to CFR block 102 is a multiband input.

Optionally, if CFR block output 114 does not have a sample rate which is compatible with DAC 106, CFR block output 114 may be provided to sample rate converter ("SRC") 104, and the output of SRC 104 may be provided to DAC 106. Optionally, a digital pre-distorter ("DPD") 103 may be coupled between CFR block output 114 and SRC 104, and a microprocessor 105 may be coupled to receive CFR block output 114 and coupled to such a DPD 103 for control thereof as is known.

Figure 2:
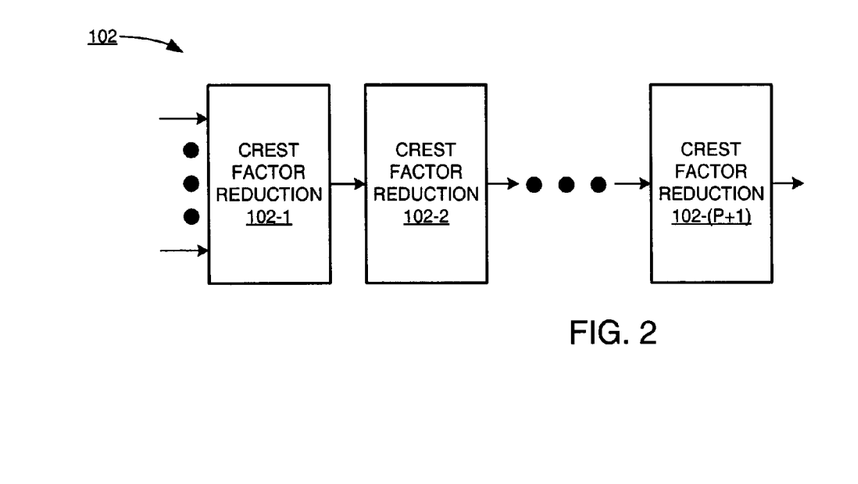
FIG. 2 is a high-level block diagram depicting an exemplary embodiment of a multi-stage crest factor reduction ("CFR") block.

CFR block 102 may include one or more CFR stages. FIG. 2 is a high-level block diagram depicting an exemplary embodiment of a multi-stage CFR block 102. CFR block 102 may include CFR stages 102-1 through 102-(P+1) for P a positive integer including zero. Basically, each CFR stage 102-(P+1) includes CFR circuitry described below in additional detail. If P equals zero, then there is only one CFR stage 102-1. The number of CFR stages may be in response to providing a progressive PAPR control, including controlling PAPR to account for peaks created by combinations of sidelobes. Notably, CFR stages 102-2 through 102-(P+1), namely CFR stages subsequent to an initial CFR stage 102-1 need not include an initial modulator, such as modulator 302 of FIG. 3, and an initial combiner, such as combiner stage 304 of FIG. 3; otherwise, CFR stages 102-1 through 102-(P+1) are similar to CFR stage 102-1.

As described above, a CFR block 102 of FIG. 1 may include one or more than one CFR stages 102-(P+1). However, for purposes of clarity, a single CFR stage 102-1 is described hereinafter, as it will be apparent that multiple CFR stages may be used from the following description.

Figure 3:
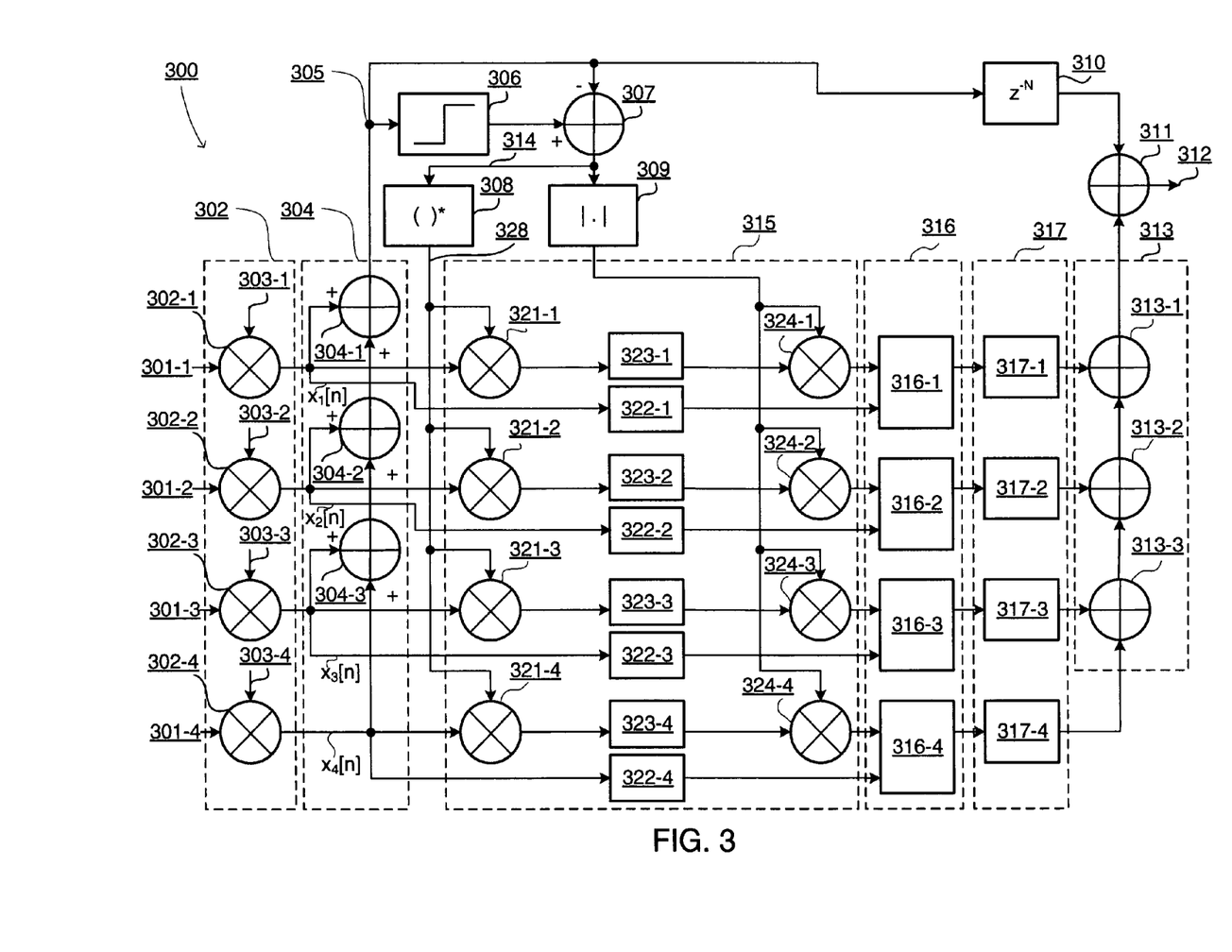
FIG. 3 is a high-level block/schematic diagram depicting an exemplary embodiment of a single CFR stage.

FIG. 3 is a high-level block/schematic diagram depicting an exemplary embodiment of a single CFR stage, namely CFR circuit 300. Baseband signals 301-1 through 301-4 ("baseband signals 301"), are input to a modulator 302. It should be understood that for a multiband transmitter, baseband signals 301 may be associated with respective channels or sub-channels of a channel, where channel bandwidth may be divided into subspaces. The subspaces may be associated with non-overlapping frequency bands, where each such subspace has independent statistical characteristics. Though four baseband signals 301 are illustratively shown, it should be understood that a set of N baseband signals, for N an integer greater than one may be used. For example, baseband signals 301 may be a set of N independent complex Gaussian signals $z_i[n]$ for i from 1 to N, where $z_i$ is approximated by $N(0,2\sigma^2)$.

Modulator 302 may include respective complex multipliers 302-1 through 302-4 ("multipliers 302") coupled for respective input of baseband signals 301. Respectively input to each of multipliers 302 is a respective modulating signal, namely, modulating signals 303-1 through 303-4 ("modulating signals 303"). Modulating signals 303 may be mathematically expressed as $e^{j\omega_i n}$, for i from 1 to N. Notably, modulator 302 may shift bands in either a positive or negative direction in this example for subsequent single-side band filtering. However, for purposes of clarity, it will be assumed that only positive shifts are done for a single-side band filtering, though single-side band filtering in a negative direction or double band filtering may be used. Accordingly, output from modulator 302 are respective component signals of constituent signals, namely baseband signals 301, where each component signal center frequency is shifted from a baseband frequency, such that each component signal occupies a respective non-overlapping frequency band.

Output of modulator 302 is provided to a combiner stage 304. Each output of multipliers 302 is added to provide a combined or superposed signal 305. In this example, combiner stage 304 includes three adders 304-1 through 304-3 for sequentially adding outputs from multipliers 302. Superposed signal 305 may be mathematically expressed as equal to:

$$y[n] = \sum_{i=1}^{N} z_i[n] e^{-2\pi j \omega_i n} \triangleq \sum_{i=1}^{N} x_i[n] \quad (1)$$

CFR circuit 300 is configured to control PAPR of a CFR adjusted version of superposed signal 305, namely, CFR adjusted superposed signal 312. Superposed signal 305 may be provided to clipper 306, adder 307 and delay 310. Delay 310 may be used to delay superposed signal 305 for input to adder 311 to generally be in phase with output of combiner stage 313. Delay 310 is inserted to compensate for a group delay associated with noise-shaping filters described below in additional detail. Clipping error is added back into delayed superposed signal 305 in phase. Notably, clipping error is a summation of a plurality of clipping errors, each of which is respectively associated with a channel.

The multiband CFR is for control of the PAPR of this combined signal y[n] through adding a clipping noise q[n]. This clipping noise may conform to the following constraints:

C1: Bounded PAPR metric $\dfrac{\max|y[n]+q[n]|}{\sqrt{\sigma_y^2+\sigma_q^2}} \leq PAPR_o$;

C2: Bounded in-band energy $\dfrac{\int_{\Omega_i}|Q(\omega)|^2 d\omega}{\int_{\Omega_i}|Y(\omega)|^2 d\omega} < EVM$;

C3: Phase invariance for each constituent signal $z_i[n]$; and

C4: Bounded out-of-band spectral leakage $\dfrac{\int_{\Omega_i}|Y(\omega)|^2 d\omega}{\int_{\Omega_i}|Q(\omega)|^2 d\omega} > ACLR$.

For the above constraints C1 through C4, it should be understood that $Q(\omega)$ and $Y(\omega)$ are the Fourier transform of the clipping noise and superimposed signal respectively. Also, $\Omega_i$ and $\Omega_o$ correspond to the in-band frequency range and the out-of-band frequency range, respectively. With respect to constraint C3, phase invariance means tracking or otherwise preserving the phase information for each constituent signal $z_i[n]$.

To address constraints C1 and C2, clipping may be used. Clipper 306 is set to clip-off peaks of superposed signal 305. For example, clipper 306 may have an upper threshold and a lower threshold to clip magnitudes of superposed signal 305 that are above the upper threshold or below the lower threshold. Notably, two clipper stages may be used.

Notably, clipping may be done either as a function of Cartesian coordinates or polar coordinates. In Cartesian clipping, quantization may be done individually on real and imaginary component, and thus is somewhat less complex than polar clipping. Though both Cartesian clipping and polar clipping both limit the absolute value of a signal to a certain PAPR, their respective effects on overall EVM may be substantially different. Accordingly, prior to continuing the description of FIG. 3, statistical characteristics for Cartesian and polar clipping single-band CFR are described. The description that follows may be used in deciding whether to use polar or Cartesian clipping. For the mathematical expressions that follow, real and imaginary operators are represented by ˜ and ˆ superscripts, respectively.

For Cartesian clipping, mapping between the original and clipped signal is defined as $y_c = S(\tilde{y}, \gamma_c) + jS(\hat{y}, \gamma_c)$, wherein S(.) is saturated amplifier characteristics defined as:

$$S(x, \gamma_c) \triangleq \begin{cases} \gamma_c & \text{if } x > \gamma_c \\ x & \text{if } |x| \leq \gamma_c \\ -\gamma_c & \text{if } x < -\gamma_c \end{cases} \quad (2)$$

The real component of an error signal in Cartesian clipping is computed according to:

$$\tilde{e} = \begin{cases} \gamma_c - \tilde{y} & \text{if } \tilde{y} > \gamma_c \\ -\gamma_c - \tilde{y} & \text{if } \tilde{y} < -\gamma_c \\ 0 & \text{otherwise} \end{cases} \quad (3)$$

The real and imaginary components of an error signal are independent and identically distributed with $E[|e|^2]=2E[\tilde{e}^2]=2E[\hat{e}^2]$. Similarly, the variance of a clipped signal can be obtained from $$E[|y_c|^2] = 4\left(\int_0^{\gamma_c} \frac{x^2 e^{-\frac{x^2}{2\sigma^2}}}{\sqrt{2\pi}\,\sigma} dx + \gamma_c^2 \int_{\gamma_c}^{\infty} \frac{e^{-\frac{x^2}{2\sigma^2}}}{\sqrt{2\pi}\,\sigma} dx\right) = \quad (4)$$

$$2\sigma^2 + 4Q\left(\frac{\gamma_c}{\sigma}\right)(\gamma_c^2 - \sigma^2) - 2\sqrt{\frac{2}{\pi}}\,\gamma_c\sigma\exp\left(-\frac{\gamma_c^2}{2\sigma^2}\right)$$

and the probability distribution function ("pdf") of the real and imaginary components of the error signal is distributed according to:

$$P_{\tilde{y}_c}(u) = P_{\hat{y}_c}(u) = \delta(u - \gamma_c)Q\left(\frac{\gamma_c}{\sigma}\right) + \quad (5)$$

$$\delta(u + \gamma_c)Q\left(\frac{\gamma_c}{\sigma}\right) + \begin{cases} \frac{1}{\sqrt{2\pi}\,\sigma}\exp\left(-\frac{u^2}{2\sigma^2}\right) & \text{if } |u| \le \gamma_c \\ 0 & \text{otherwise} \end{cases}$$

Using the above pdf, the normalized noise variance for Cartesian clipping is computed as:

$$\sigma_n^2 \triangleq \frac{E[|e|^2]}{2\sigma^2} = \frac{4}{2\sigma^2}\int_0^{\infty} \frac{1}{\sqrt{2\pi}\,\sigma} u^2 e^{-\frac{(u+\gamma_c)^2}{2\sigma^2}} du = \quad (6)$$

$$2\frac{\gamma_c^2 - \sigma^2}{\sigma^2}Q\left(\frac{\gamma_c}{\sigma}\right) - \sqrt{\frac{2}{\pi}}\,\frac{\gamma_c}{\sigma}\exp\left(-\frac{\gamma_c^2}{2\sigma^2}\right)$$

Notably, the input backoff ("$I_{bo}$") for Cartesian clipping is defined as $$I_{bo} \triangleq \frac{\gamma_c^2}{\sigma^2}.$$

As opposed to the Cartesian clipping where quantization is done individually on the real and imaginary components, polar clipping quantizes the magnitude of a resultant complex signal. Given a complex Gaussian signal $\tilde{y}+j\hat{y}=Re^{jv}$, its magnitude, i.e., $R=\sqrt{\tilde{y}^2+\hat{y}^2}$, Rayleigh distributed with a pdf of $$f_R(r) = \frac{r}{\sigma^2}e^{\left(-\frac{r^2}{2\sigma^2}\right)} \text{ for } r \ge 0.$$

The quantization operation is defined as $y_c=\tilde{y}_c+j\hat{y}_c=R_c e^{jv}$ in which $R_c=S(R, \gamma_p)$. Thus, $R_c$ has a truncated Rayleigh distribution as:

$$p_{R_c}(r) = \exp\left(-\frac{\gamma_p^2}{2\sigma^2}\right)\delta(r - \gamma_p) + \begin{cases} \frac{r}{\sigma^2}\exp\left(-\frac{r^2}{2\sigma^2}\right) & \text{if } r \le \gamma_p \\ 0 & \text{otherwise} \end{cases} \quad (7A)$$

with the variance of the clipped signal being defined as:

$$E[|y_c|^2] = \int_0^{2\pi}\int_0^{\gamma_p}\frac{1}{2\pi}r^2 f_{R_c}(r)dr\,d\vartheta = 2\sigma^2\left(1 - \exp\left(-\frac{\gamma_p^2}{2\sigma^2}\right)\right) \quad (7B)$$

The joint pdf for the clipped signal is computed according to:

$$p_{\tilde{y}_c,\hat{y}_c}(u, v) = \frac{1}{r}p_{R_c}, \quad (7C)$$

$$\Theta_c(r, \vartheta) = \frac{1}{2\pi\sqrt{u^2+v^2}}\exp\left(-\frac{\gamma_p^2}{2\sigma^2}\right)\delta\left(\gamma_p - \sqrt{u^2+v^2}\right) +$$

$$\begin{cases} \frac{1}{2\pi\sigma^2}\exp\left(-\frac{u^2+v^2}{2\sigma^2}\right) & \text{if } \sqrt{u^2+v^2} \le \gamma_p \\ 0 & \text{otherwise} \end{cases}$$

Inherited from the circular symmetric property of $f_{\tilde{y},\hat{y}}(u,v)$, $E[\tilde{y}_c,\hat{y}_c]$ equals 0. Thus, $E[\tilde{y}_c^2]$ equals $0.5\times E[|y_c|^2]$. The marginal pdf of the real and imaginary components of the clipped signal is of the form:

$$p_{\tilde{y}_c}(u) = \frac{\exp\left(-\frac{u^2}{2\sigma^2}\right)}{\sqrt{2\pi}\,\sigma} \times \left(1 - 2Q\left(\sqrt{\frac{\gamma_p^2 - u^2}{\sigma^2}}\right)\right) + \frac{\exp\left(-\frac{\gamma_p^2}{2\sigma^2}\right)}{\pi\sqrt{\gamma_p^2 - u^2}} \quad (8)$$

Accordingly, the random variables $\tilde{y}_c$ and $\hat{y}_c$ are dependent, though uncorrelated, in this example. Using the above expressions, the normalized variance of the clipping noise may be determined as:

$$\sigma_n^2 \triangleq \frac{E[|e[n]|^2]}{2\sigma^2} = \quad (9)$$

$$\int_{\gamma_p}^{\infty}(r-\gamma_p)^2\frac{r}{2\sigma^4}e^{-\frac{r^2}{2\sigma^2}}dr = \exp\left(-\frac{\gamma_p^2}{2\sigma^2}\right) - \frac{\gamma_p}{\sigma}\sqrt{2\pi}\,Q\left(\frac{\gamma_p}{\sigma}\right)$$

For polar clipping, $I_{bo}$ is defined as $$\frac{\gamma_p^2}{2\sigma^2}.$$

Accordingly, it should be understood that either polar clipping or Cartesian clipping may be used. However, for a given back-off level $I_{bo}$, normalized noise variance of Cartesian clipping may be higher than that of polar clipping. Higher noise power may in turn mean higher EVM of a transmitter. Assuming transmitter EVM is a concern, the remainder of this description is done in terms of polar clipping. Clipping error of noise for a superposed signal 305 may be denoted as e[n]. The clipping noise, e[n], which is equal to the superimposed signal with clipping, $y_c[n]$, less the superimposed signal without clipping, y[n], is added to the signal, such that the PAPR of the combined signal is $$PAPR_o = \frac{\gamma_p^2}{E[X_c^2]} = \frac{I_{bo}}{1 - \exp(-I_{bo})} \quad (10)$$

For signal clipping in the multiband environments, clipping for CFR in multiband systems is further described. As described above, the clipping noise e[n] would limit the PAPR of the combined signal. However, since the error component e[n] is not necessarily phase aligned with the constituent signals, $x_i[n]$, multiband components are subject to phase rotation. To address constraint C3, the error signal may be projected into the signal subspace. To avoid phase distortion due to clipping, clipping noise e[n] should lie in subspace spanned by component signals $x_i[n]$, namely respective outputs of multipliers 302. Given the error vector e[n] and the constituent signal components $\{x_i[n]\}$, error is projected to signal subspace as:

$$\min_{\alpha_i \in R} \left| e[n] - \sum_{j=1}^{N} \alpha_j x_j[n] \right|^2 = \min \|e[n] - V^T[n]A\|^2 \quad (11)$$

wherein $$A \triangleq [\alpha_1 \alpha_2 \cdots \alpha_N]^T \text{ and } V[n] \triangleq [x_1[n]x_2[n] \cdots x_N[n]]^T.$$

The least square solution to Equation (11) above may be obtained as:

$$A_{LS} = (\Re\{V^*[n]V^T[n]\})^{-1} \Re\{V^*[n]e[n]\} \quad (12A)$$

In practice, inverting this matrix of Equation 12A is a formidable task and one can use the following approximation to compute the matrix inversion as:

$$\Re\{V^*[n]V^T[n]\} \cong \text{Diag}(|x_1[n]|^2 |x_2[n]|^2 \ldots |x_N[n]|^2) \quad (12B)$$

To comply with constraint C4, projected error signals $e_j[n]$ may be filtered, such as with corresponding bandpass filters $h_j[k]$ tuned to the center frequency of a jth sub-band as:

$$q[n] = \sum_{j=1}^{N} \sum_{k=0}^{M-1} e_j[n-k] h_j[k] \quad (13A)$$

Replacing Equation (13A) into Equation (12A) results in:

$$e_j[n] \triangleq \alpha_j x_j[n] = \frac{<e[n], x_j[n]>}{|x_j[n]|_2^2} x_j[n] = \|e[n]\|_2 \cos\phi_j e^{j\angle x_j[n]} \quad (13B)$$

wherein $\phi_j$ is the angle between the composite error e[n] and the jth constituent signal $x_j[n]$.

Thus, it should be understood that $e_j[n]$, where n is a pulse in a digital pulse chain and j is for a respective channel, represents error introduced by clipping, namely clipping noise. Clipping noise is confined to a frequency band associated with a channel, as indicated in Equation (13B). Magnitude of clipping noise for a channel j is the magnitude of the total error signal, such as e[n] signal 314, caused by clipping, namely error caused by PAPR clipping, $\|e[n]\|_2$, of superposed signal 305, times the cosine of the angle between a jth component signal $x_j[n]$ and composite error signal, namely e[n] signal 314. Phase relationship is maintained by $e^{j\angle x_j[n]}$, where the angle $\angle x_j[n]$ is the phase of $x_j[n]$. Notably, when magnitude, generally obtained by multiplying cosine $\phi_j$ times |e[n]|, is added back into a superposed signal, phase relationship for the component signal is maintained with its constituent signal. Clipping noise may next be reconstructed through superposition of resultant sequences $e_j[n]$, filtered by to noise shaping filters $h_j[k]$ as set forth in Equation (13A).

The variance of the clipping noise may thus be computed as:

$$E[|q|^2] = E[|e[n]|^2] * \sum_{k=0}^{M-1} h_j^2[k] \quad (13C)$$

The PAPR of a signal is controlled by adjusting the clipping threshold in the clipping function. The error signal is then projected into the signal subspace to obtain the closest approximation to the error signal that preserves the phase information of each constituent signal $\{x_i[n]\}$. The projected error components are passed through the noise shaping filters to comply with the spectral emission mask of the transmitter and finally added to the superimposed signal. To obtain a single-side band ("SSB") bandpass filter response, the pass-band error signals are frequency down-converted to the baseband using complex synthesizers, filtered by an efficient Interpolated FIR ("IFIR") structure and then up-converted to the corresponding center frequency of each sub-carrier.

An upper bound for the PAPR of the output signal is computed as $$PAPR_o \leq \frac{\left(\gamma_p + \sum_{j,j\neq 0} \left|g\left[j\frac{T_c}{T_s}\right]\right| \max|e|\right)^2}{E[X_c[n]^2] + E[e[n]^2] \sum_{j,j\neq 0} \left|g[i]\right|^2} = \quad (14)$$

$$\frac{\left[\sqrt{I_{bo}} + \sum_{j,j\neq 0} \left|g\left[j\frac{T_c}{T_s}\right]\right|\right]}{1 - \exp(-I_{bo}) + [\exp(-I_{bo}) - 2\sqrt{\pi I_{bo}} Q(\sqrt{2I_{bo}})] \sum_{i,i\neq 0} |g[i]|^2}$$

wherein $PAPR_i$ is the input PAPR and $$g[n] \triangleq \sum_j h_j[n]$$

is the aggregate response of the noise shaping filters. Several aspects of both the interpretation and implications of the above bound are worth developing in more detail. First, it is important to note that the second term in the numerator corresponds to the destructive effect of the noise shaping filter. Notably, the successive peaks of the signal may have temporal separation larger than $$T_c \approx \frac{1}{W},$$

in which W is the bandwidth of the signal. Having this in mind, for a noise shaping filter with sampling frequency of $T_s$, the maximum error corresponds to the sum of the absolute value of $$g\left[j\frac{T_c}{T_s}\right]$$

times the maximum error magnitude. As the bandwidth of the signal increases, it causes the sum absolute term to grow, resulting in higher output PAPR. Secondly, as noted in the Equation (14), the denominator consists of two terms; the first term is the variance of a clipped signal and the second term is the excessive noise variance due to noise shaping.

Output of clipper 306 is a clipped version of superposed signal 305 and is provided to adder 307. Superposed signal 305 prior to clipping by clipper 306 is provided to a subtraction port of adder 307. Accordingly, output of adder 307 is a gross or total error signal e[n] 314, which represents the total error or noise introduced by clipper 306 clipping of superposed signal 305. Superposed signal 305 is provided to conjugator 308 and magnitude circuit 309. Accordingly, conjugator 308 provides the conjugate of total error signal 314 and magnitude circuitry 309 outputs the magnitude of total error signal 314, namely |e[n]|.

Output of conjugator 308 is a conjugated form of total error signal 314 caused by clipping operation 306. Conjugated output 328 is provided as an input to each of multipliers 321-1 through 321-4. Outputs from multipliers 301-1 through 303-4 are respectively input to multipliers 321-1 through 321-4. Outputs from multipliers 301-1 through 303-4 include respective angles between conjugated output 328 and a respective one of component signals $x_i[n]$.

Multipliers 321-1 through 321-4 may be part of a least squares fit circuit 315. Least squares fit circuit 315 may be used to provide a realization of Equation (13B). Respective outputs from multipliers 321-1 through 321-4 are respective signal inputs for arc tangent/cosine circuits 322-1 through 322-4. Circuits 322-1 through 322-4 may be used to obtain the real part of each component signal $x_j[n]$ as set forth in Equation (13B), where outputs of circuits 322-1 through 322-4 are for providing a portion of Equation (13B). Outputs of circuits 322-1 through 322-4 are respectively provided as inputs to multipliers 324-1 through 324-4. Also provided as input to each of multipliers 324-1 through 324-4 is magnitude output from magnitude circuitry 309 of total error signal 314 for least squares fit circuit 315. Notably, real and imaginary signal component inputs for arc tangent/cosine look-up tables may be the same set of tables, where for example a conjugate of one of the inputs is used.

Accordingly, output of multipliers 324-1 through 324-4 is the product of the magnitude of total error, namely $\|e[n]\|_2$ cos $\phi_j$. For example, output of multiplier 324-3 is the product of |e[n]| cos $\phi_3$. Outputs from multipliers 324-1 through 324-4 are respectively provided as inputs to polar to Cartesian coordinate converters 316-1 through 316-4. Additionally, respectively provided to polar to Cartesian coordinate converters 316-1 through 316-4 is phase information for component signals x[n] through $x_4[n]$, as described below in additional detail.

Outputs from multipliers 302-1 through 302-4 are respectively provided as inputs to Cartesian to polar phase converters 322-1 through 322-4. Output of phase converters 322-1 through 322-4 may be mathematically expressed as an exponent of j times the angle of a component signal $x_i[n]$, namely $e^{j\angle x_i[n]}$ as set forth in Equation (13B). In other words, only polar phase information is output from these phase converters. Thus, a phase relationship for each component as indicated above with reference to Equation (13B) is tracked or otherwise preserved. Accordingly, it should be appreciated that output of least squares fit circuit 315 is thus generally phase invariant with respect to the constituent signals input. Outputs from phase converters 322-1 through 322-4 are respectively provided to polar to Cartesian coordinate converters 316-1 through 316-4.

Output of polar to Cartesian coordinate converters 316-1 through 316-4 is respectively provided as input to bandpass filters 317-1 through 317-4. Each bandpass filter 317 may have respective filter coefficients for bandpass filtering a frequency band associated with a respective modulation input signal to multipliers 302. In other words, modulation input signals 303-1 through 303-4 have respective frequencies which are associated respectively with coefficients for bandpass filters 317-1 through 317-4.

Figure 4:
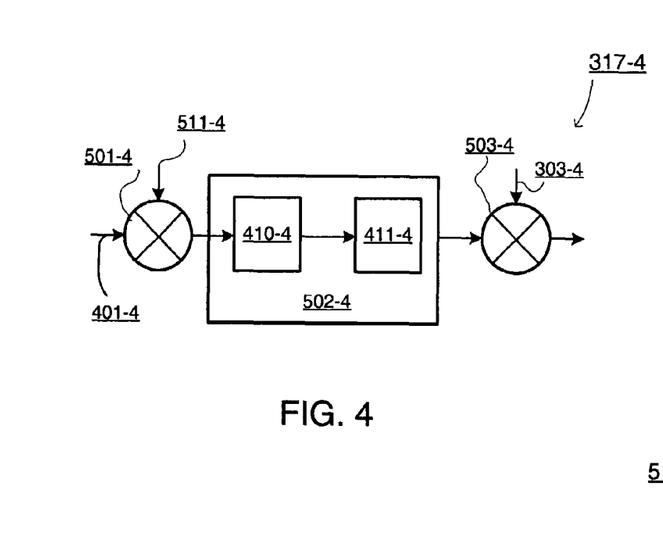
FIG. 4 is a high-level block/schematic diagram depicting an exemplary embodiment of a bandpass filter.

FIG. 4 is a high-level block/schematic diagram depicting an exemplary embodiment of a bandpass filter 317-4 of FIG. 3. Notably, only one example is shown for purposes of clarity, as multiple bandpass filters respectively for each component signal may be understood from this example. These bandpass filters were described generally with reference to Equation (13A).

With simultaneous reference to FIGS. 3 and 4, input to multiplier 501-4 is output 401-4 from converter 316-4 and another input 511-4 which is of the form $e^{-j\omega n_i}$, for i equal to four in this example. Output of multiplier 501-4 is provided to a first transform stage 410-4. Output of the first transform stage is provided to a second transform stage 411-4. Output of the second transform stage 411-4 is provided as an input to multiplier 503-4, along with modulation input signals 303-4. Output of multiplier 503-4 is provided as an input to adder 313-3. Where the first and the second transform stage may respectively be generally mathematically expressed as $H(z^J)$ and $G(z)$. Such noise shaping bandpass filters may have one or more of the following characteristics: they may be tuned during operation ("on-the-fly"); they may have a SSB to allow for spectral allocation for both positive and negative frequencies; and they may have sufficient out-of-band attenuation to achieve higher ACLR.

Figure 5:
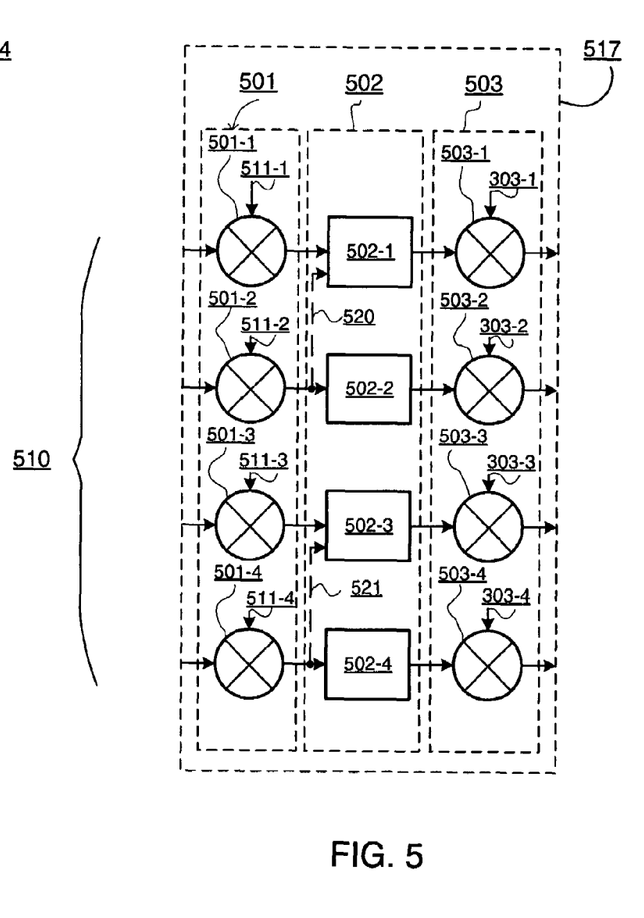
FIG. 5 is a high-level block/schematic diagram depicting another exemplary embodiment of a bandpass filter.

Alternatively, in FIG. 5, there is shown another exemplary embodiment of a bandpass filter 517, which may be substituted for bandpass filter 317 of FIG. 3. Bandpass filter 517 includes three stages, namely input stage 501, bandpass filtering stage 502, and output stage 503. Input stage 501 includes multipliers 501-1 through 501-4. Outputs of polar to Cartesian coordinate converters 316-1 through 316-4 are respectively input as inputs 510 to multipliers 501-1 through 501-4. Inputs 511-1 through 511-4 are respectively input to multipliers 501-1 through 501-4, where each input 511-1 through 511-4 is of the form $e^{-j\omega n_i}$, for i one through four in this example. Thus multipliers 501-1 through 501-4 are employed in input stage 501 to shift each respective input to a same baseband frequency. Accordingly, each output from multipliers 501-1 through 501-4 is centered to a baseband frequency. Thus, each bandpass filter 502-1 through 502-4 of bandpass filter stage 502 may have the same coefficients as all filtering is done at a baseband frequency.

This simplifies design of baseband filter stage 502 as all bandpass filters have the same filter coefficients. Moreover, this facilitates changing the center frequency of each band, such as of channel inputs 301-1 through 301-4 of FIG. 3, while operating CFR circuit 300. In other words, CFR circuit 300 of FIG. 3 with bandpass filter 517 instead of bandpass filter 317 may have input channels changed, such as shifts in center frequency, during operation, as no change in bandpass filter coefficients need be done to accommodate such changes in channel center frequency. Moreover, because each of bandpass filters 502-1 through 502-4 are the same, one or more outputs of multiplexers 501-1 through 501-4 may share a bandpass filter 502 as respectively indicated by dashed lines 520 and 521, where a switching device may be employed as part of a bandpass filter to select as between inputs for bandpass filtering. However, for purposes of clarity, it shall be assumed that bandpass filters 502 are not shared.

Outputs from bandpass filters 502-1 through 502-4 are respectively provided to multipliers 503-1 through 503-4. Other inputs respectively provided to multipliers 503-1 through 503-4 are modulation input signals 303-1 through 303-4. Accordingly, it should be understood that inputs 501-1 through 501-4 are the respective conjugate values of modulation input signals 303-1 through 303-4. To shift or otherwise modulate outputs of bandpass filters 502-1 through 502-4 away from a baseband frequency to respective non-overlapping bands, modulation input signals 303-1 through 303-4 may be used again as illustratively shown.

With simultaneous reference to FIGS. 3 through 5, CFR circuit 300 is further described. Output of either bandpass filters 317 or 517 is provided to combiner stage 313. Combiner stage 313 may comprise adders 313-1 through 313-3 for sequentially summing outputs from either bandpass filters 317-1 through 317-4 or 502-1 through 502-4. A total error signal, where each error component is confined to a particular band, is provided as an output from such sequential summing to adder 311. Adder 311 combines delayed superposed signal 305 with band-limited and band-associated error components to provide error-adjusted superposed signal 312.

Notably, for CFR circuit 300 no a priori baseband information need be passed down for turning channels off or otherwise inactive. For example, if a channel associated with constituent signal 301-2 were shut off, then output of multiplier 302-1 would be a logic zero. A logic zero input to converter 316-1, or a logic zero input to a bandpass filter 317-1 or 502-1, would result in a logic zero output. Thus, a logic zero for an error associated band would be added, for example by adder 313-1, for this channel. This means that no error correction is passed to the band of a channel that is inactive. In other words, there is no exchange of information from a baseband signal for an associated projected error.

Figure 6:
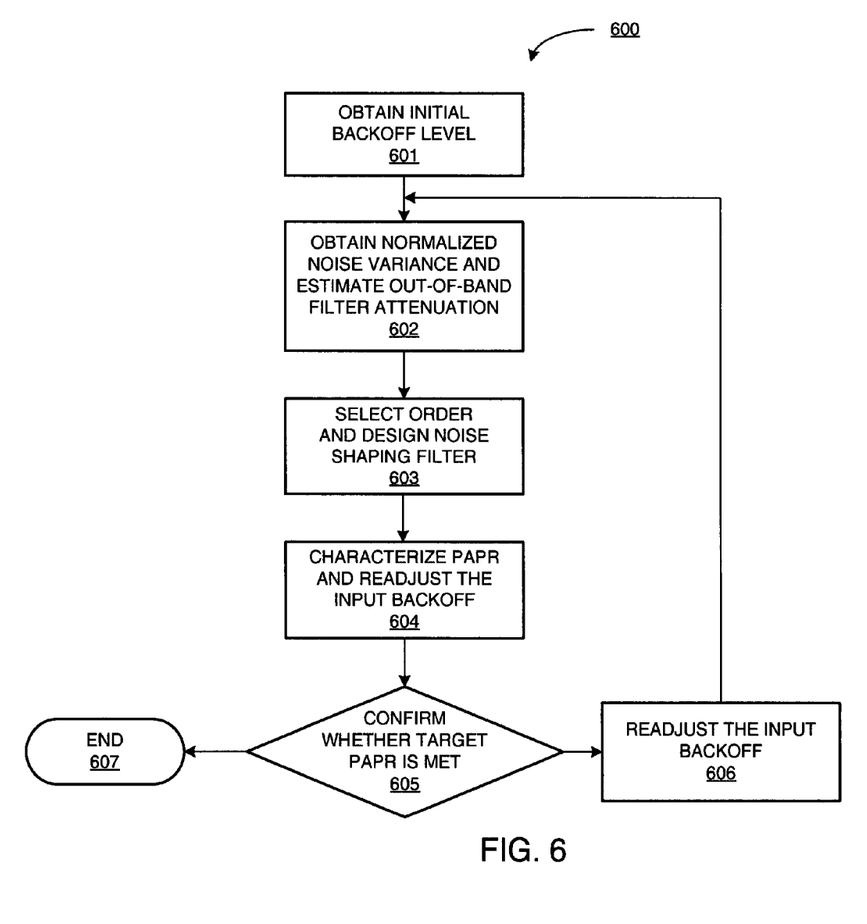
FIG. 6 is a high-level flow diagram depicting an exemplary embodiment of a design procedure for design a CFR block for multiband transmitters.

FIG. 6 is a high-level flow diagram depicting an exemplary embodiment of a design procedure 600 for design a CFR block for multiband transmitters. At 601, for a given PAPR, an initial backoff level $I_{bo}$ for the CFR input from Equation (10) is obtained. Note that this backoff does not account for excessive PAPR due to noise shaping. Since the excess PAPR is a function of the noise shaping filter that is not known at this stage, the $I_{bo}$ may be reduced by a margin, from approximately 0.5 to 1 dB, to account for the excess PAPR due to the filtering.

At 602, from backoff level $I_{bo}$ versus normalized variance of clipping for either polar or Cartesian clipping, normalized noise variance ($\sigma_n^2$) for an input backoff level of 601 is obtained. The normalized noise variance value indicates the relative energy of the quantization noise with respect to the signal. Based on this value, the out-of-band filter attenuation may be estimated using $A(dB)=ACLR(dB)-\sigma_n^2$.

At 603, from the filter attenuation A(dB) obtained at 602, and the transition band $\Omega_i$, appropriate order for the noise shaping filter may be selected and design of an FIR noise shaping filter may be done in accordance with the order.

At 604, for a filter specification obtained at 603, the PAPR using Equation (14) may be characterized and the input backoff may be readjusted to assure the appropriate PAPR setting.

At 605, it is determined whether or not a target PAPR has been met. If such a target PAPR has been met design procedure 600 may end at 607.

If, however, at 605, a target PAPR is not met, then the input backoff $I_{bo}$ may be readjusted at 606 and steps 601 through 605 may be reiterated to determine if the target $PAPR_o$ is met.

Systems designers may be interested in exploiting noise shaping filters with high attenuation characteristics for improving the ACLR metric. Sharp transition characteristics in turn may result in long impulse responses that may cause peak regrowth due to destructive accumulation of error samples in the filter output. This effect may be mainly due to the second term in the numerator of Equation (14). Thus, for aggressive ACLR specifications, the PAPR specification if not met using a single CFR stage, may be met by using successive CFR stages of clipping followed by noise shaping.

Marginal pdf of a clipped signal may be obtained by integrating the pdf from Equation (7) with respect to one of the variables as:

$$p_{\tilde{x}_c}(u) = \int p_{\tilde{x}_c, \hat{x}_c}(u, v) dv = \quad (15)$$

$$\int_{-\infty}^{\infty} \frac{1}{2\pi\sqrt{u^2+v^2}} \exp\left(-\frac{\gamma_p^2}{2\sigma^2}\right) \delta\left(\gamma_p - \sqrt{u^2+v^2}\right)$$

$$dv \int_{-\sqrt{\gamma_p^2-u^2}}^{\sqrt{\gamma_p^2-u^2}} \frac{1}{2\pi\sigma^2} \exp\left(\frac{u^2+v^2}{2\sigma^2}\right) dv$$

The first integral on the right hand side of Equation (15) may be written as:

$$I_1(u) = \exp\left(-\frac{\gamma_p^2}{2\sigma^2}\right) \lim_{\varepsilon \to 0} \frac{1}{2\pi} \int_{\sqrt{\gamma_p^2-u^2}-\varepsilon}^{\sqrt{\gamma_p^2-u^2}+\varepsilon} \frac{\delta\left(\gamma_p - \sqrt{u^2+v^2}\right)}{\sqrt{u^2+v^2}} dv + \quad (16)$$

$$\frac{1}{2\pi} \int_{-\sqrt{\gamma_p^2-u^2}-\varepsilon}^{-\sqrt{\gamma_p^2-u^2}+\varepsilon} \frac{\delta\left(\gamma_p - \sqrt{u^2+v^2}\right)}{\sqrt{u^2+v^2}} dv$$

Using the change of variable $z=\sqrt{u^2+v^2}-\gamma_p$, the integrals in Equation (16) respectively become:

$$\lim_{\varepsilon \to 0} \frac{1}{\pi} \int_{-\varepsilon}^{+\varepsilon} \frac{\exp\left(-\frac{\gamma_p^2}{2\sigma^2}\right) \delta(z)}{\sqrt{(z+\gamma_p)^2 - u^2}} dz = \begin{cases} \frac{\exp\left(-\frac{\gamma_p^2}{2\sigma^2}\right)}{\pi \sqrt{\gamma_p^2 - u^2}} & \text{if } |u| \le \gamma_p \\ 0 & \text{otherwise} \end{cases} \quad (17)$$

and $$I_2(u) = \begin{cases} \frac{\exp\left(-\frac{u^2}{2\sigma^2}\right)}{\sqrt{2\pi}\,\sigma} \times \left(1 - 2Q\left(\sqrt{\frac{\gamma_p^2 - u^2}{\sigma^2}}\right)\right) & \text{if } |u| \le \gamma_p \\ 0 & \text{otherwise} \end{cases} \quad (18)$$

Substituting Equations (17) and (18) into Equation (15) results in Equation (8).

Notably, CFR circuit 300 may be implemented in an application specific circuit or in a programmable logic device. With respect to the latter, a Field Programmable Gate Array ("FPGA") may be used. A known FPGA, such as a Virtex-4 from Xilinx of San Jose, Calif., includes embedded multipliers ("EMULT") blocks, block random access memories ("BRAMs"), and configurable logic blocks ("CLBs"), among other circuitry. BRAMs may be configured to provide look-up tables ("LUTs") which may be used for finding a cosine value, as previously mentioned. For using BRAMs, Equation (13B) may be modified to:

$$e_i[n] = |e[n]| \cos \phi e^{j \angle e[n]} \quad (19)$$

Thus, noise is projected into sub-bands by multiplying an error vector by cosine of the angle between an error signal and each component signal. Each channel may employ a separate BRAM to store a cosine function. This approximation reduces design complexity at a slight reduction in performance.

CFR circuit 300 may be implemented in an FPGA. Below is an example of an FPGA in which CFR circuit 300 may be implemented. Moreover, an entire transmitter 110 may be implemented in an FPGA.

Figure 7:
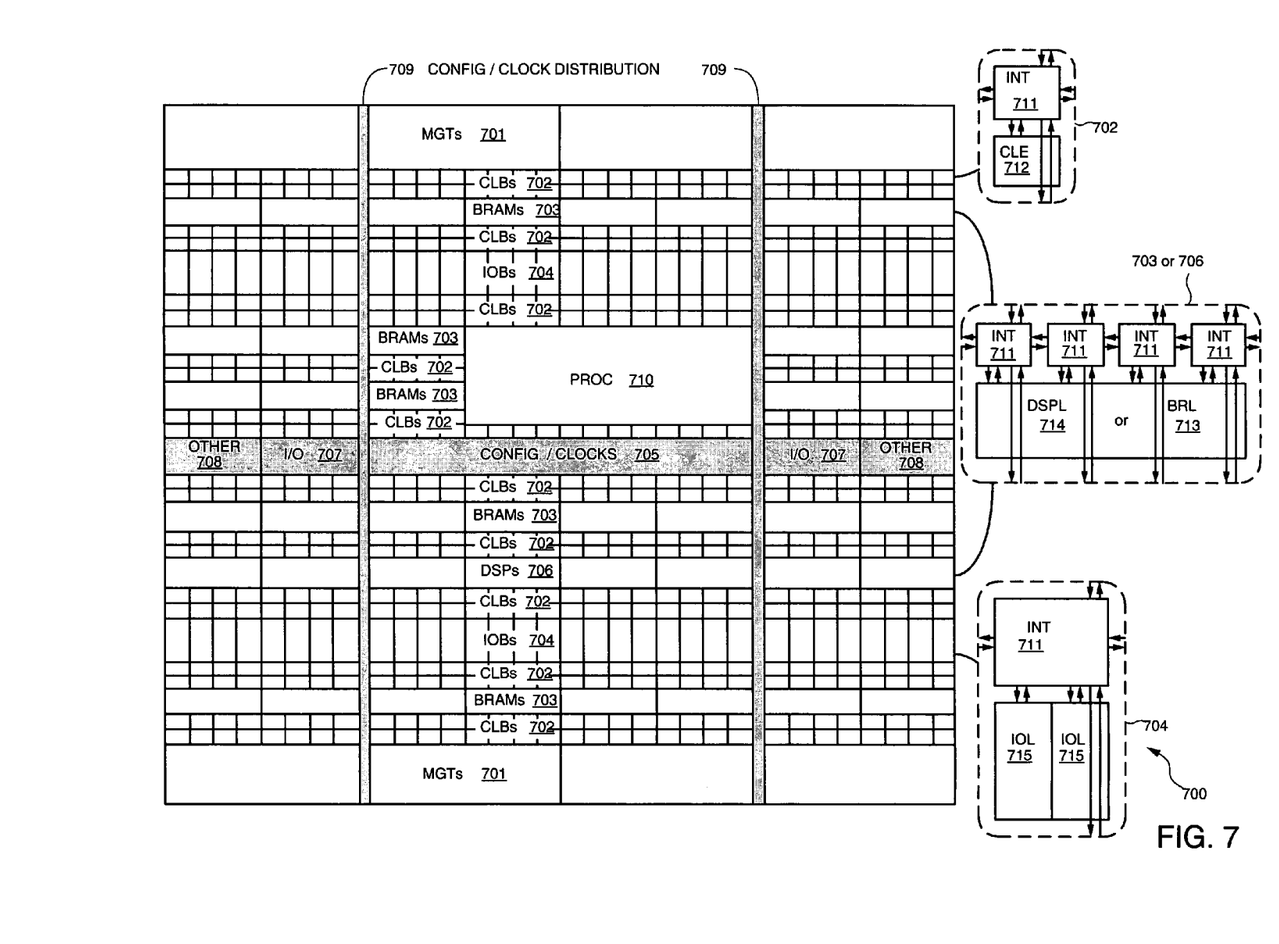
FIG. 7 is simplified block diagrams depicting an exemplary embodiment of Field Programmable Gate Array architecture in which one or more aspects of the invention may be implemented.

As noted above, advanced FPGAs can include several different types of programmable logic blocks in the array. For example, FIG. 7 illustrates an FPGA architecture 700 that includes a large number of different programmable tiles including multi-gigabit transceivers ("MGTs") 701, configurable logic blocks ("CLBs") 702, random access memory blocks ("BRAMs") 703, input/output blocks ("IOBs") 704, configuration and clocking logic ("CONFIG/CLOCKS") 705, digital signal processing blocks ("DSPs") 706, specialized input/output blocks ("I/O") 707 (e.g., configuration ports and clock ports), and other programmable logic 708 such as digital clock managers, analog-to-digital converters, system monitoring logic, and so forth. Some FPGAs also include dedicated processor blocks ("PROC") 710.

In some FPGAs, each programmable tile includes a programmable interconnect element ("INT") 711 having standardized connections to and from a corresponding interconnect element in each adjacent tile. Therefore, the programmable interconnect elements taken together implement the programmable interconnect structure for the illustrated FPGA. The programmable interconnect element 711 also includes the connections to and from the programmable logic element within the same tile, as shown by the examples included at the right of FIG. 7.

For example, a CLB 702 can include a configurable logic element ("CLE") 712 that can be programmed to implement user logic plus a single programmable interconnect element 711. A BRAM 703 can include a BRAM logic element ("BRL") 713 in addition to one or more programmable interconnect elements. Typically, the number of interconnect elements included in a tile depends on the height of the tile. In the pictured embodiment, a BRAM tile has the same height as four CLBs, but other numbers (e.g., five) can also be used. A DSP tile 706 can include a DSP logic element ("DSPL") 714 in addition to an appropriate number of programmable interconnect elements. Examples of DSPLs 714 include embedded multiplier ("EMULT") blocks, which may have either or both of the above-mentioned coefficient setting capabilities.

An IOB 704 can include, for example, two instances of an input/output logic element ("IOL") 715 in addition to one instance of the programmable interconnect element 711. As will be clear to those of skill in the art, the actual I/O pads connected, for example, to the I/O logic element 715 are manufactured using metal layered above the various illustrated logic blocks, and typically are not confined to the area of the input/output logic element 715.

In the pictured embodiment, a columnar area near the center of the die (shown shaded in FIG. 7) is used for configuration, clock, and other control logic. Vertical areas 709 extending from this column are used to distribute the clocks and configuration signals across the breadth of the FPGA.

Some FPGAs utilizing the architecture illustrated in FIG. 7 include additional logic blocks that disrupt the regular columnar structure making up a large part of the FPGA. The additional logic blocks can be programmable blocks or dedicated logic. For example, the processor block PROC 710 shown in FIG. 7 spans several columns of CLBs and BRAMs.

Note that FIG. 7 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 7 are purely exemplary. For example, in an actual FPGA more than one adjacent column of CLBs is typically included wherever the CLBs appear, to facilitate the efficient implementation of user logic.

While the foregoing describes exemplary embodiment(s) in accordance with one or more aspects of the invention, other and further embodiment(s) in accordance with the one or more aspects of the invention may be devised without departing from the scope thereof, which is determined by the claim(s) that follow and equivalents thereof. For example, it was assumed that the component signals occupy non-overlapping frequency bands, though they may occupy overlapping frequency bands. Claim(s) listing steps do not imply any order of the steps. Trademarks are the property of their respective owners.

What is claimed is:

1. A method for crest factor reduction in a multiband transmitter, comprising:
   obtaining baseband signals;
   combining the baseband signals to provide a superposed signal;
   clipping the superposed signal to limit magnitude of the superposed signal;
   obtaining a clipping error caused by the clipping;
   least squares projecting of the clipping error into sub-band components of the baseband signals to provide projected error components;

filtering the projected error components;
upconverting the projected error components to frequency bands associated with the baseband signals; and
adding the projected error components filtered and upconverted to the superposed signal.

2. The method, according to claim 1, wherein the frequency bands are associated with a channel bandwidth.

3. The method, according to claim 2, wherein the baseband signals are obtained by modulating constituent signals.

4. The method, according to claim 3, wherein the baseband signals occupy non-overlapping frequency bands.

5. The method, according to claim 1, wherein the least squares projecting is an approximation of a least squares fit.

6. The method, according to claim 5, wherein the least squares projecting includes:
multiplying magnitude of the clipping error by cosine of each angle between the clipping error and the baseband signals to obtain clipping noise error magnitudes; and
respectively multiplying the clipping noise error magnitudes by respective phase information for each of the baseband signals.

7. The method, according to claim 6, wherein the least squares projecting includes converting the phase information of the baseband signals from Cartesian coordinate form to polar coordinate form.

8. The method, according to claim 7, wherein the projected error components obtained from respective multiplication of the clipping noise error magnitudes by the phase information for each of the baseband signals is converted from the polar coordinate form to the Cartesian coordinate form.

9. A method for crest factor reduction in a multiband transmitter, comprising:
obtaining a clipped version of a superposed signal;
obtaining an error component associated with the clipped version of the superposed signal;
projecting the error component into sub-bands using a least squares estimation to provide sub-band errors;
spectrally shaping the sub-band errors to comply with an adjacent channel leakage ratio of the multiband transmitter;
frequency modulating resultant noise from the shaping of the sub-band errors to corresponding sub-band frequencies to provide error components; and
combining the error components spectrally shaped and frequency modulated with the superposed signal.

10. The method, according to claim 9, wherein the spectrally shaping includes bandpass filtering.

11. The method, according to claim 9, wherein the spectrally shaping includes:
shifting at least a portion of the sub-band errors to a frequency band; and
bandpass filtering the sub-band errors respectively responsive to the frequency band.

12. The method, according to claim 11, wherein the spectrally shaping includes shifting at least the portion of the sub-band errors back to the sub-bands respectively associated therewith.

13. The method, according to claim 12, wherein the frequency band is associated with a baseband.

14. The method, according to claim 13, wherein the bandpass filtering includes frequency tuning during operation and spectral allocation for both positive and negative frequencies.

15. The method, according to claim 13, wherein the bandpass filtering includes sharing at least one bandpass filter for the spectrally shaping among at least the portion of the sub-band errors.

16. The method, according to claim 9, wherein the combining the error components spectrally shaped and frequency modulated with the superposed signal includes delaying the superposed signal for phase alignment with a combined version of the error components spectrally shaped and frequency modulated.

17. An integrated circuit for crest factor reduction in a multiband transmitter, comprising:
modulators for receiving constituent signals and frequency shifted signals, the constituent signals associated with a signal space, the modulators configured to provide component signals respectively associated with the constituent signals, the component signals occupying respective signal subspaces of the signal space;
a first combiner coupled to receive the component signals and configured to combine the component signals to provide a superposed signal;
a clipping circuit coupled to receive the superposed signal and configured to provide a clipped superposed signal;
a second combiner coupled to receive and to combine the superposed signal with the clipped superposed signal to generate a clipping error signal;
a least squares fit circuit coupled to receive the component signals and the clipping error signal, the least squares fit circuit configured to project clipping noise error associated with the clipping error signal onto the signal subspaces of the component signals;
a bandpass filtering circuit coupled to receive the component signals with the clipping noise error projected thereon and configured to provide noise-shaped subspace error signals respectively responsive to bandpass filtered versions of the component signals to remove at least a portion of the clipping noise error respectively projected thereon;
a third combiner coupled to receive the noise-shaped subspace error signals and configured to combine the noise-shaped subspace error signals to provide a noise-shaped space error signal; and
a fourth combiner coupled to receive the superposed signal and the noise-shaped space error signal at least approximately phase aligned and configured to combine the superposed signal and the noise-shaped error signal to provide a crest factor adjusted version of the superposed signal.

18. The integrated circuit, according to claim 17 wherein the clipping error signal is constrained by the adjacent channel leakage ratio ("ALCR"), peak-to-average power ratio ("PAPR"), and error vector magnitude ("EVM") parameters.

19. The integrated circuit, according to claim 17, further comprising a coordinate converter coupled to receive the component signals with the clipping noise error projected thereon, the component signals being divided into respective sets of magnitude and phase signals by the least squares fit circuit, the coordinate converter configured to convert the sets of magnitude and phase signals from polar coordinates to Cartesian coordinates.

20. The integrated circuit, according to claim 19, wherein at least the least square fit circuit of the integrated circuit is instantiated in programmably configurable logic.

* * * * *